3,311,660
PROCESS FOR PREPARING 2-(4-HYDROXYPHEN-
YL)-2-(4'-AMINOPHENYL)-METHANES
Heinrich Krimm, Krefeld-Bockum, and Hermann Schnell, Krefeld-Urdingen, Germany, assignors to Farbenfabriken Bayer Aktiengesellschaft, Leverkusen, Germany, a corporation of Germany
No Drawing. Filed July 15, 1963, Ser. No. 295,203
Claims priority, application Germany, July 16, 1962,
F 37,328
5 Claims. (Cl. 260—570)

The present invention is concerned with new hydroxy-amino compounds and with the production thereof.

The new hydroxy-amino compounds of the present invention are methanes substituted by (a) a hydroxyphenyl radical, (b) an aminophenyl radical and (c) at least one radical selected from the group consisting of alkyl and phenyl radicals and supplemental members of a cycloalkyl ring. The compounds are 2-(4-hydroxyphenyl)-2-(4'aminophenyl) methanes of the formula

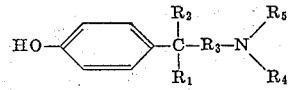

wherein:

$R_1$ and $R_2$ when taken individually are members selected from the group consisting of hydrogen, lower alkyl and phenyl with the proviso that at least one of $R_1$ and $R_2$ is other than hydrogen and $R_1$ and $R_2$ when taken together with the carbon to which they are attached stand for cyclohexyl, $R_3$ stands for a member selected from the group consisting of phenyl, monochlorophenyl, dichlorophenyl, mononitrophenyl, mono lower alkyl and monochlorophenyl, mono lower alkyl phenyl and dilower alkyl phenyl, and $R_4$ and $R_5$ stand for hydrogen, lower alkyl and cyclohexyl.

Some hydroxy-amino diphenyl methanes are already known, namely N-dimethylaminophenyl-4-hydroxyphenyl-methane, as well as a derivative thereof, the hydroxyphenyl residue of which is substituted in the 2- and 5-position by the methyl group. These methane derivatives are produced by the reaction of N-dimethyl-aniline with 1 - hydroxy - 2,5 - dibromo - 4 - bromomethyl - benzene or with 1-hydroxy-2,5-dibromo-3,6-dimethyl - 4 - bromomethyl-phenol, with the removal of hydrogen bromide and the splitting off of both aromatically bound bromine atoms with sodium in boiling alcohol. Thus, two special materials and a process for their production are here concerned which, because of the difficulty of obtaining the starting materials and because of its laboriousness, is of no interest from a technical point of view.

In contradistinction thereto, the process according to the present invention for the production of new hydroxy-amino compounds consists in the addition of aromatic amines to vinyl-phenols at elevated temperatures in the presence of acidic catalysts or of salts of aromatic amines with strong acids, but possibly also in the presence of basic catalysts.

Of the vinyl-phenols which may be used for the process of the present invention, there may be mentioned, for example, o-, m- and p-vinyl phenol, p-(2-methyl-vinyl)-phenol,
p-(2-ethyl-vinyl)-phenol,
p-(2,2-dimethylvinyl)-phenol,
p-(2-propyl-vinyl)-phenol,
p-(2-isopropyl-vinyl)-phenol,
p-(2-butyl-vinyl)-phenol,
p-(2-methyl-2-propyl-vinyl)-phenol,
p-(2-methyl-2-isopropyl-vinyl)-phenol,
p-(2,2-diethyl-vinyl)-phenol,
p-(2-ethyl-2-isopropyl-vinyl)-phenol,
o-, m- and p-(1-methyl-vinyl)-phenol (i.e. o-, m- and p-isopropenyl-phenol),
p-(1-methyl-2-methyl-vinyl)-phenol (i.e. p-isobutenyl-phenol),
p-(1-methyl-2-ethyl-vinyl)-phenol,
p-(1-methyl-2-propyl-vinyl)-phenol,
p-(1-methyl-2-isopropyl-vinyl)-phenol,
p-(1-methyl-2-methyl-2-ethyl-vinyl)-phenol,
p-(1-ethyl-vinyl)-phenol,
p-(1-ethyl-2-methyl-vinyl)-phenol,
p-(1-ethyl-2-ethyl-vinyl)-phenol,
p-(1-ethyl-2-propyl-vinyl)-phenol,
p-(1-ethyl-2-isopropyl-vinyl)-phenol,
p-(1-propyl-vinyl)-phenol,
p-(1-propyl-2-methyl-vinyl)-phenol.
p-(1-propyl-2-ethyl-vinyl)-phenol,
p-(1-isopropyl-vinyl)-phenol,
p-(1,2-tetramethylene-vinyl)-phenol,
p-(1-phenyl-vinyl)-phenol and
p-(1-methyl-vinyl)-o-cresol.

The vinyl phenols, particularly the especially valuable p-isopropenyl-phenol, may be obtained, for example, by the catalytic splitting of the corresponding dihydroxydiaryl-alkanes especially with the use of alkaline-acting materials as splitting catalysts, according to the process of our copending patent application Ser. No. 44,848, filed July 25, 1960 and now abandoned.

Instead of the monomeric vinyl-phenols, there can also be used, with advantage, their oligomers, such as the dimers and trimers produced from p-isopropenyl-phenol.

Examples of aromatic amines which may be used include, for example, aniline, o-chloro-aniline, p-chloro-aniline, 2,5-dichloro-aniline, 2,6-dichloro-aniline, 3,5-dichloro-aniline, o-nitro-aniline, m-nitro-aniline, o-toluidine, m-toluidine, 2,6-xylidine, 3,5-xylidine, 5-chloro-2-methyl-aniline, o-isopropyl-aniline, 2,6-diethyl-aniline, o-butyl-aniline, o-isopropyl-aniline, 2,6-diethyl-aniline, o-butyl-aniline, o-tert.-butyl-aniline, o-isobutyl-aniline, α-naphthylamine, β-naphthylamine, N-methyl-aniline, N,N-dimethylaniline, N-ethyl-aniline, N,N-diethyl-aniline, N-isopropyl-aniline, N-butyl-aniline and N-cyclohexyl-aniline, as well as diarylamines and aromatic polyamines, such as phenylene-diamines.

The proportion of the reaction components to one another are to be chosen in such a manner that the aromatic amine is present in excess. In general, it is expedient to use about 2–5 mol of the aromatic amine per mol of vinyl-phenol.

The reaction temperatures expediently lie between about 100 and about 250° C., preferably between about 150 and about 200° C.

As acidic catalysts there can be used, for example, strong mineral acids, such as hydrogen halide acids, especially hydrochloric acid, as well as sulfuric acid, nitric acid, and phosphoric acid, or aryl-sulfonic acids, such as benzene-sulfonic acid, toluene-sulfonic acid or cationic exchanger resins of the sulfonated polystyrene type, as well as Lewis acids, such as zinc chloride, aluminum chloride, boron trifluoride, boron trifluoride etherate, ferric chloride, tin tetrachloride and activated bleaching or fuller's earth, as well as, in general, ion exchangers with strong acid groups. Anhydrous salts of strong acids with aromatic amines, preferably those which are to react with the vinyl-phenol, may also be used.

Although acidic catalysts are, in general, especially preferred for the process according to the present invention, in some cases basic catalysts can also be used with advantage. Examples of basic catalysts which may be used include, for example, alkali metals and alkaline earth metals and the oxides, hydroxides, alcoholates, phenolates, alkylcarboxylates, carbonates, amides and hydrides thereof.

The catalysts can be added to the reaction mixture in anhydrous form, as well as in the form of concentrated aqueous solutions, insofar as this is possible.

The necessary amount of catalyst depends upon the reactivity of the components, especially of the aromatic amines. It can easily be determined by simple experiments and amounts, in general, to about 0.01 to 1.0 gram equivalents per mol of vinyl-phenol.

Inert solvents, such as aromatic hydrocarbons, for example, benzene, toluene and xylene, chlorinated hydrocarbons, for example, chlorobenzenes, ethers, for example, diphenyl ether and dioxane, or alcohols, for example, nonanol and cyclohexanol, can be used, if desired.

The products for the process are, in general, well crystallized and, therefore, precipitate, as a rule, from the reaction mixture and can be filtered off after neutralization to a pH value of 6–8 and dilution with a suitable solvent, such as benzene, toluene, methylene chloride or carbon tetrachloride. In some cases, working up can also be carried out by distillation. It is then advisable to neutralize exactly the solutions of the products of the process and to wash them free of salt in order to avoid decomposition.

The new hydroxy-amino-diphenyl-methanes can serve as anti-oxidants, stabilizers or inhibitors for plastic materials and also as intermediates for the production of dyestuffs and synthetic resins.

The following examples are given for the purpose of illustrating the present invention.

*Example 1*

A mixture of 134 grams (1 mol) of p-isopropenyl-phenol, 186 grams (2 mol) of aniline and 32.6 grams (0.25 mol) of aniline hydrochloride is heated, with stirring and passing over of nitrogen, to 170° C., whereupon the reaction product crystallizes out within a few minutes. The reaction material is broken up in a pestle or in a mixing device in the presence of methylene chloride and water and neutralized with a solution of sodium carbonate to a pH value of 7–8. The crystals are filtered off with suction and dried. Yield: 191 grams. Melting point: 190–191° C. After recrystallizing from methanol under nitrogen, the melting point rises to 191–192° C. A further small amount of the reaction product can be obtained from the methylene chloride solution by evaporation and boiling out the residue with toluene. Total yield: 204 grams (90% of theory).

The 2,2-(4-hydroxy-4'-amino-diphenyl)-propane obtained dissolves in aqueous solutions of acids and strong bases. It has the following constitution:

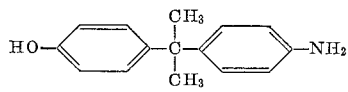

*Example 2*

A mixture of 134 grams (½ mol) of dimeric p-isopropenyl-phenol, 280 grams (3 mol) of aniline and 5 grams of aniline sulfate is heated for 15 minutes at 190° C. The reaction product is worked up as in Example 1. There are obtained 197 grams of 2,2-(4-hydroxy-4'-amino-diphenyl)-propane with a melting point of 189–190° C. Yield: 87.5% of theory.

*Example 3*

A mixture of 134 grams (½ mol) of dimeric p-isopropenyl-phenol, 280 grams (3 mol) of aniline and 30 grams of activated bleaching earth is heated, with stirring and passing over of nitrogen, for ½ hour at 190° C. The reaction product is boiled up with 2.5 liter of methanol and filtered. 120 grams of crystals with a melting point of 188–189° C. precipitate out from the cooled methanolic solution. After distilling off the solvent and excess aniline from the mother liquor, there is obtained a residue of 110 grams. This is triturated with methylene chloride. The crystals obtained are thereafter filtered off with suction. Yield: 191 grams (84% of theory) of 2,2-(4-hydroxy-4'-amino-diphenyl)-propane.

*Example 4*

A mixture of 134 grams of dimeric p-isopropenyl-phenol (½ mol), 280 grams (3 mol) of aniline and 30 grams of cross linked sulfonated polystyrene is heated for 15 minutes to 185–190° C. The reaction product is worked up as in Example 3. Yield: 189 grams (83.4% of theory) of 2,2-(4-hydroxy-4'-amino - diphenyl) - propane.

*Example 5*

A mixture of 134 grams (½ mol) of dimeric p-isopropenyl-phenol, 280 grams (3 mol) of aniline and 7.1 grams (0.05 mol) of boron trifluoride etherate is heated, with stirring and passing over of nitrogen, for 20 minutes at 180° C. The reaction product is worked up as in Example 1. Yield: 181 grams (80% of theory) of 2,2-(4-hydroxy-4'-amino-diphenyl)-propane.

*Example 6*

A mixture of 134 grams (1 mol) of p-isopropenyl-phenol, 214 grams (2 mol) of N-methyl-aniline and 36 grams (0.25 mol) of N-methyl-aniline hydrochloride is heated, with stirring and passing over of nitrogen, for 5 minutes at 190° C. The reaction product is then diluted with water and methylene chloride and brought to a pH value of 8 with a solution of sodium carbonate. The crystals of 2,2-(4-hydroxy - 4' - methylamino - diphenyl)-propane obtained are filtered off with suction and washed with methylene chloride. Yield: 150 grams (62.3% of theory). Melting point: 136–137° C.

*Example 7*

A mixture of 134 grams (1 mol) p-isopropenyl phenol, 302 grams (3 mol) of dimethyl-aniline and 20 grams of concentrated sulfuric acid is heated, with stirring and passing over of nitrogen, for 15 minutes at 180° C. The reaction product is diluted with methylene chloride and water, brought to a pH value of 8 with a solution of sodium carbonate, the solvent and excess dimethyl-aniline are evaporated off in a vacuum and the residue (250 grams) boiled out with cyclohexane. There are obtained 112 grams of 2,2-(4-hydroxy-4'-dimethylamino-diphenyl)-propane of melting point 102–103° C. (from cyclohexane). Yield: 44% of theory.

*Example 8*

A mixture of 134 grams (½ mol) of dimerized p-isopropenyl-phenol, 321 grams (3 mol) of o-toluidine and 20 grams of concentrated sulfuric acid is heated, with stirring and passing over of nitrogen, for 15 minutes at 190° C. After dilution with methylnee chloride and water, the reaction product is adjusted to a pH value of 8. The crystals of 2,2-(4-dihydroxy-4'-amino-3'-methyl-diphenyl)-propane obtained are thereafter filtered off with suction (172 grams). The melting point amounts to 174–175° C. The mother liquor is concentrated and the excess o-toluidine distilled off in vacuum. The residue is then boiled out with toluene. There are thus obtained a further 40 grams of the reaction product so that the total yield amounts to 212 grams (88% of theory). After recrystallization from toluene/methanol (7:1), the melting point amounts to 177–178° C.

*Example 9*

A mixture of 134 grams (0.5 mol) of dimeric p-isopropenyl-phenol, 383 grams (3 mol) of o-chloroaniline and 20 grams of concentrated sulfuric acid is heated, with stirring and passing over of nitrogen, for 15 minutes at 190° C. After dilution with methylene chloride and water, the reaction mixture is brought to a pH value of 7. The organic layer is concentrated, the excess o-chloroaniline distilled off in a vacuum and the residue (244 grams) recrystallized from toluene. Melting point: 139–140° C. Yield: 170 grams (65% of theory) of 2,2-(4-hydroxy-4′-amino-3′-chloro-diphenyl)-propane.

Example 10

A mixture of 70 grams (0.4 mol) of p-cyclohexenyl-phenol, 112 grams (1.2 mol) of aniline and 34 grams of p-toluene-sulfonic acid is heated for 15 minutes at 190° C. The reaction mixture is diluted with methylene chloride and water and adjusted to a pH value of 8. The crystals obtained from the reaction mixture are thereafter separated off (yield 49 grams). The remaining methylene chloride solution is concentrated and the excess aniline distilled off in a vacuum. The residue obtained (50 grams) is boiled out several times with toluene. For the toluene solution, a further 15 grams of the reaction product are obtained, the melting point of which amounts to 150–152° C. and, after recrystallization from toluene, to 160–161° C. The yield of 1,1-(4-hydroxy-4′-amino-diphenyl)-cyclohexane amounts in all to 64 grams i.e. 60% of theory.

We claim:
1. A process for the production of 2-(4-hydroxyphenyl)-2-(4′-aminophenyl)-methanes of the formula:

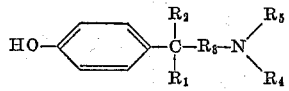

wherein:
$R_1$ and $R_2$ when taken individually are members selected from the group consisting of hydrogen, lower alkyl and phenyl with the proviso that at least one of $R_1$ and $R_2$ is other than hydrogen and $R_1$ and $R_2$ when taken together with the carbon to which they are attached stand for cyclohexyl,
$R_3$ stands for a member selected from the group consisting of phenyl, monochlorophenyl, dichlorophenyl, mononitrophenyl, mono lower alkyl-monochlorophenyl, mono lower alkyl phenyl and dilower alkyl phenyl, and
$R_4$ and $R_5$ stand for hydrogen, lower alkyl and cyclohexyl, comprising adding an aromatic amine of the residual formula

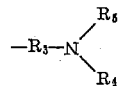

on to a compound selected from the group consisting of a monomeric or dimeric vinyl phenol at a temperature of between about 100 to about 250° C. in the presence of a catalyst selected from the group consisting of an acidic substance and a basic substance.

2. A process according to claim 1 wherein the reaction takes place at a temperature between about 150 and 200° C.

3. A process according to claim 1 wherein about 2–5 mol of said aromatic amine is used per mol of vinylphenol.

4. A process according to claim 1 wherein about 0.01 to 1.0 gram equivalents of catalyst are used per mol of vinyl phenol.

5. A process according to claim 1 wherein the reaction is carried out in the presence of an inert solvent.

References Cited by the Examiner

UNITED STATES PATENTS

| 1,954,377 | 4/1934 | Calcott et al. |
| 2,034,491 | 3/1936 | Sloan. |
| 2,714,120 | 7/1955 | Kehe _____ 260—619 |
| 2,888,438 | 5/1959 | Katz. |

FOREIGN PATENTS

| 502,860 | 3/1939 | Great Britain. |
| 831,828 | 4/1960 | Great Britain. |

OTHER REFERENCES

Kaslow et al., Jour. Amer. Chem. Soc., vol. 68, pp. 2600–2 (1946).

Sunagawa, Chemical Abstract, vol. 50, p. 10055 (1956).

CHARLES B. PARKER, *Primary Examiner.*

ROBERT V. HINES, *Assistant Examiner.*